US008693050B2

(12) United States Patent
Mestha et al.

(10) Patent No.: US 8,693,050 B2
(45) Date of Patent: Apr. 8, 2014

(54) CONTROLLING PROCESS COLOR IN A COLOR ADJUSTMENT SYSTEM

(75) Inventors: Lalit Keshav Mestha, Fairport, NY (US); Wenjie Dong, Monterey Park, CA (US)

(73) Assignee: Xerox Corporation, Norwalk, CT (US)

( * ) Notice: Subject to any disclaimer, the term of this patent is extended or adjusted under 35 U.S.C. 154(b) by 1048 days.

(21) Appl. No.: 12/536,600

(22) Filed: Aug. 6, 2009

(65) Prior Publication Data

US 2011/0032545 A1 Feb. 10, 2011

(51) Int. Cl.
*G06F 15/00* (2006.01)

(52) U.S. Cl.
USPC .................... 358/1.9; 358/504; 358/518

(58) Field of Classification Search
USPC .................... 358/1.9, 504, 518
See application file for complete search history.

(56) References Cited

U.S. PATENT DOCUMENTS 5,471,313 A * 11/1995 Thieret et al. .......... 358/296
7,069,164 B2 * 6/2006 Viturro et al. .......... 702/85
2006/0244980 A1 * 11/2006 Grace .......... 358/1.9
2008/0043271 A1 * 2/2008 Gil et al. .......... 358/1.9
2008/0055666 A1 * 3/2008 Gila et al. .......... 358/448
2009/0086234 A1 * 4/2009 Oles .......... 358/1.9
2009/0202263 A1 * 8/2009 Yoshida et al. .......... 399/49

OTHER PUBLICATIONS

U.S. Appl. No. 12/024,221, filed Feb. 1, 2008, Mestha et al.
U.S. Appl. No. 12/352,350, filed Jan. 12, 2009, Mestha et al.
Guo, L., "On Critical Stability of Discrete-Time Adaptive Nonlinear Cntrol," *IEEE Transactions on Automatic Control*, Nov. 1997, pp. 1488-1499, 42:11.

* cited by examiner

*Primary Examiner* — Steven Kau
*Assistant Examiner* — Mark Milia
(74) *Attorney, Agent, or Firm* — Philip E. Blair; Fleit Gibbons Gutman Bongini & Bianco P.L.

(57) ABSTRACT

What is disclosed is a novel system and method for controlling process color in a color adjustment system in an image marking device. A control parameter, such as a gain matrix, forms a basis of an adaptive closed-loop controller. A sensitivity matrix is used to calculate the gain matrix. This permits complex color adjustments at a customer location. The present system and method is well suited for long production runs because, as the system moves (or drifts) away from nominal, the color control system will learn the changes in the system (e.g., new input-output sensitivity) with print, measure, and prediction processes, operating on the test patches, and effectively adapt to these changes by re-computing the feedback controller gains and revising the current actuator values to follow desired target color values. The present system and method can also be used for adjusting or developing a CMYK recipe in color management LUTs.

16 Claims, 6 Drawing Sheets

CONTROLLING PROCESS COLOR IN A COLOR ADJUSTMENT SYSTEM

TECHNICAL FIELD

The present invention is directed to systems and methods for maintaining color consistency and accuracy in adaptive color control systems employed in image reproduction systems such as color printers and display devices.

BACKGROUND

In today's business and scientific world, color has become essential as a component of communication. Color facilitates the sharing of knowledge and ideas. Companies involved in the development of digital color print engines are continuously looking for ways to improve the total image quality of their products. Users have become accustomed to printers and copier devices that produce high quality color and gray-scaled output. Users expect to be able to reproduce a color image with consistent quality on any compatible image marking device. There is a need for methods which efficiently maintain print color predictability; particularly as electronic marketing has placed more importance on the accurate representation of merchandise in illustrative print or display media.

Descriptions of color, color perception, and psychological and physiological phenomena involving light, object and observer, including color measurements using spectrophotometers are described in: "*The Reproduction of Color in Photography, Printing and Television*", by: R. W. G. Hunt, $4^{th}$ Ed., Fountain Press, (1987), ISBN: 085242356. Color correction and/or color control should not be confused with color registration systems and sensors for insuring that colors are positioned properly, printed accurately, superposed correctly, and adjacent to one another.

Over time, the output of conventional image marking devices tends to drift (or deviate from predetermined standards) due to various factors which include environmental conditions (e.g., temperature, relative humidity, etc.), use patterns, component wear, types of media (e.g., different paper types and paper batches, transparencies, etc.), variations in media, variations from original models used in device initialization, and the like. When an image marking device is initialized, and at intervals thereafter, it is calibrated and characterized to produce an output as close as possible to a reference standard. Calibration and characterization processes can be time consuming and expensive. As an example, calibration and characterization of a conventional four-color CMYK (cyan, magenta, yellow, black) printer or copier involves at least the following processes: 1) generating a 3D Look-Up Table (LUT) for mapping device independent parameter space to CMY space; 2) executing a Gray Component Replacement/Under Color Removal (GCR/UCR) strategy to convert the CMY space parameters to CMYK space parameters which represent the colors of a typical four-color marking device; 3) constructing marking device Tone Reproduction Curves (TRCs) to account for marking device variability (normally done at the time of manufacturing or wherever the printer calibration and characterization process is involved); and 4) applying a suitable half-toning strategy to convert the CMYK continuous tone description obtained after using the 3D LUTs in steps 1 and 2 above and 1D LUTs in step 3 above, to the image, to a binary description (e.g., bits to be received by a raster output scanner or similar device for outputting the image). The first two steps outlined above can generally be grouped under printer characterization. The third step is normally called calibration for the purpose hereof. See, "*Color Technology for Electronic Imaging Devices*", by Henry R. Kang, SPIE Optical Engineering Press, (1997), ISBN-10: 0819421081.

In processing a color image, one important step that accounts for variations in marking device output is TRC construction. TRCs are stored plots of an input parameter value versus an output parameter value for a particular color separation such as, C, M, Y, or K. A TRC is a monotonically increasing marking device function in input-output contone space or input-output density space or input-output byte space, or combinations thereof. A TRC indicates the value of the output parameter for a specific device that is used to reproduce the input parameter (if the input and output parameters are exactly equal then the inputs and outputs are expressed in the same coordinate space). Inaccuracies in TRC construction can lead to inaccuracies in color balancing and the 3D LUT. Obtaining TRCs for a particular color marking engine is a calibration process, which can be constructed by printing predetermined target colors and measuring the printed target colors using insitu color sensors. Predetermined target colors can be printed as chronological jobs in the banner/header sheet. Target colors can be extracted from the customer image and measured either by measuring straight from the output image or by rendering subsets of customer colors as target color patches in banner and header pages. Using target colors and their measured counterparts, and by processing the measured colors, TRCs can be adjusted online at desired intervals or upon request during system or color balance setups.

Generally, obtaining 1D TRCs is associated with achieving neutral gray balance. Grayness is an indication of how "clean" a process color is compared to its theoretical ideal. Good gray has zero chroma ($a^*=b^*=0$). When equal amounts of cyan, magenta and yellow are printed on a white paper, a well balanced printer should produce a neutral gray of the same amount. Instead, a brownish color rather than a neutral gray may occur. The color reproduction system may not produce the desired gray due to various limitations on color pigments of the primaries and the internal processes of the print engine. To overcome this, gray balanced TRCs can be used as 1D LUTs to modulate the amount of cyan, magenta and yellow proportions depending on the state of the materials and the print engine. The TRCs are obtained by printing large number of patches, mostly near neutral. They are often measured using offline spectrophotometers and measured quantities are then modified, generally, by using model based algorithms to produce the desired gray balanced TRCs. Usually this process of printing and producing TRCs is iterated several times until satisfactory results are obtained. This type of approach can be time consuming and expensive due to the use of machine models and offline spectrophotometer hardware. Solutions to the foregoing color correction problems for a wide range of workflow practices are desirable.

Accordingly, what is needed in this art are increasingly sophisticated systems and method which enable customers to manipulate color in ways that improve workflow and productivity.

BRIEF SUMMARY

What is disclosed is a novel system and method for adaptive color control in color adjustment systems employed in color reproduction devices. An adjusted gain matrix forms a basis for the present adaptive closed loop controller to control a given color inside the gamut of a color reproduction device. The present system and method is well suited for long production runs because, as the system starts to deviate from nominal, the adaptive color controller will learn the changes in the system (e.g., new input-output sensitivity) with print, measure, and prediction processes operating on test patches. In such a manner, the present controller is adaptive to color changes in the device by re-computing the feedback controller gains and revising actuator values to follow desired targets to achieve color consistency and accuracy. Advantageously, the present adaptive color controller mitigates unnecessary excursions of current or live actuators (as opposed to nominal or predetermined values in manufacturing) and reduces sensitivity to noise. The present system and method can also be used for adjusting or developing a CMYK recipe for a target color in color management LUTs.

In one example embodiment, the present method of controlling process color in a color reproduction system involves performing the following. A target color value of a target color test patch for a marking job is received. An initial sensitivity of output color with respect to a nominal actuator is also received. The initial sensitivity is created by checking the actuator over an expected range and includes a parameter matrix, a set of basis vectors, a nominal reflectance spectrum, and a nominal Jacobian matrix. A control parameter, such as a gain matrix, is determined using the initial sensitivity. The spectra is then measured of at least one reproduced test patch and at least one value of a current actuator. A change in sensitivity of spectra of the reproduced patch is then determined. The gain matrix control parameter is updated using the initial sensitivity and a change in sensitivity is calculated. The change in sensitivity may additionally include the use of a spectral principal component analysis (PCA) based color model. In another embodiment, a switch is used for selecting which feedback value of an estimated color value from an image marking model and a spectra of the reproduced color patch is used for subtracting from the color value of the patch. The present system method may also include updating the control parameter by deriving a Jacobian matrix comprising at least a nominal Jacobian and a delta Jacobian (both in spectral space) which is updated from the spectra of the reproduced color. The nominal Jacobian can be extracted from a model for the device under test.

One embodiment of the present adaptive color controller utilizes a two step algorithm. First, a device calibration is performed wherein actuators are set. Second, a learning step is performed wherein a new sensitivity is calculated. The spectra of one or more overlay color patches are measured with an optical sensor. Actuator values (e.g., level 2 xerographic subsystem actuators) are noted. The set points (i.e., targets) to level 2 controllers can act as actuators for implementing an even higher level learning control loop, which is often needed to provide corrections to system using measurements from the color sensors without making changes to the existing level 2 xerographic process control loops. The dependence of the spectrum on subsystem actuators (exposure, charge level, development voltage, and the like) is measured over the expected range, (i.e., the range these are expected to vary to control color consistency). After all the spectra have been measured, the spectral basis vectors and their respective weights can be calculated. When the printer is in use, the sensitivity to the actuator set points will tend to change. By an implementation hereof, the sensitivity is updated over time by monitoring a difference between what the model predicts for a given color and what is being measured by the color sensor(s).

Other features and advantages of the above-described system and method will become more readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
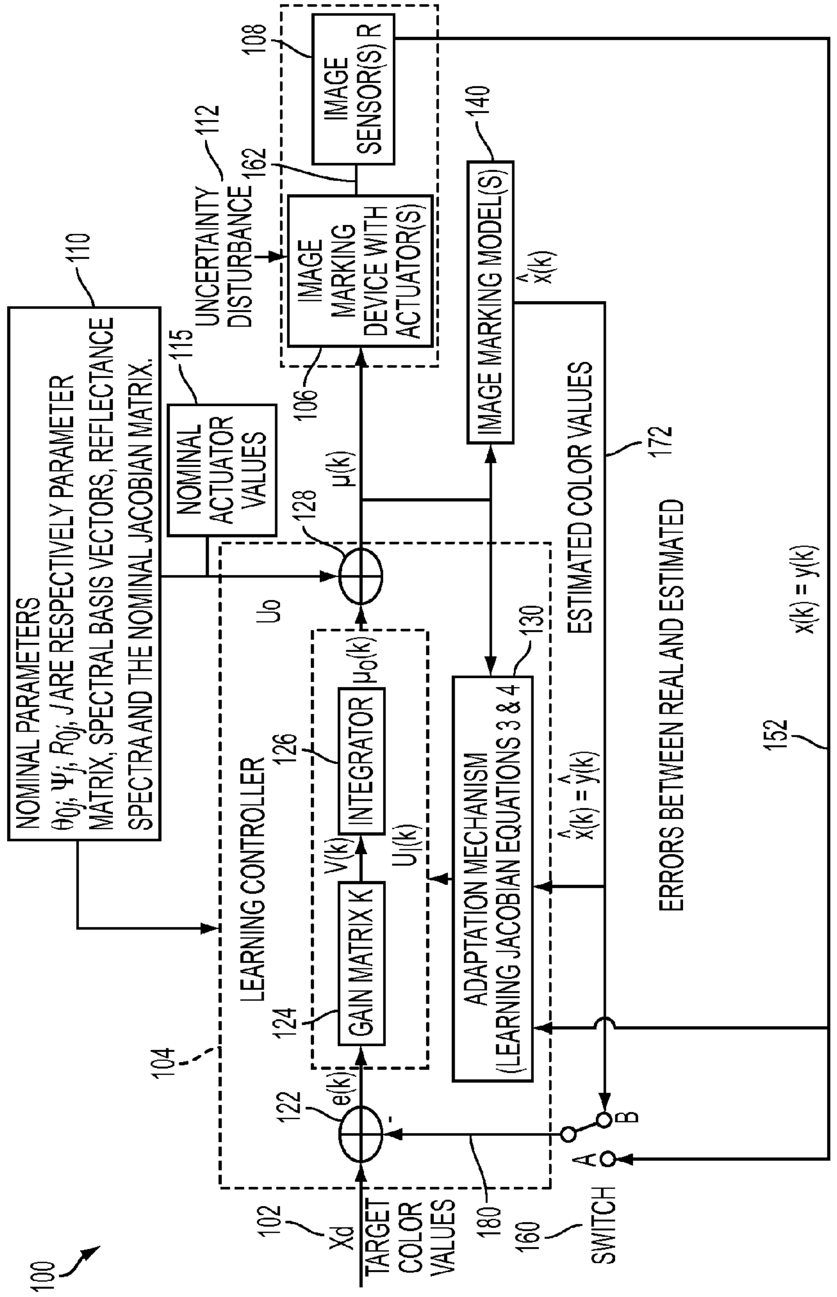
FIG. 1 is a block diagram which illustrates one example embodiment of the structure and functions performed by an example color marking device.

What is disclosed is a novel system and method for adaptive color control in a color adjustment system of a color marking device. The present adaptive color control system adapts to changes in the system (e.g., new input-output sensitivity) with print, measure, and prediction processes operating on test patches. The present system and method provides a distributed spectral model and an adaptation method for image marking devices such as digital document reproduction printers.

It should be understood that one of ordinary skill in this art would be readily familiar with many facets of color science such as, but not limited to, color space, color gamuts, gamut mapping, and other related techniques and algorithms commonly found in the color science arts such as, for instance, color management, device color characterization, color quantization, gamut mapping, computationally efficient transform algorithms, color image processing. Those of ordinary skill would be familiar with the text: "*Digital Color Imaging Handbook*", 1st Ed., CRC Press (2003), ISBN-10: 084930900-X, ISBN-13: 9780849309007, which is incorporated herein in its entirety by reference. It should be understood that one of ordinary skill in this art would also be readily familiar with many facets of control system design, such as pole placement, controller design, multiple-input-multiple-output systems, singular value decomposition, principal component analysis. The book: "*Control of Color Imaging Systems: Analysis and Design*", Lalit K. Mestha and Sohail A. Dianat, CRC Press (2009), ISBN-13: 9780849337468, is incorporated herein in its entirety by reference. One skilled in this art would also be knowledgeable about the various advanced matrix methods and other matrix techniques and algorithms commonly employed in the color science arts. One of ordinary skill would also be knowledgeable about computer science, and software and hardware programming systems and methods to implement the functionality and capabilities described herein in their own system environments without undue experimentation.

The set of complex multifunction devices to which the present system and method are directed is intended to encompass a wide variety of digital document printers/copiers, book/magazine/newspaper and other digital printing presses, and other multi-function document reproduction systems. Such systems generally include a display such as a CRT or touch screen along with one or more user interfaces such as a keyboard, mouse, keypad, touchpad, and the like, for entering data and configuring device-specific settings to optimize image quality and performance. Such device-specific settings may differ from a first and second side of a given media. Such complex devices further incorporate an image processing or color management system for processing image data and performing color adjustments. The image processing system can be a hardware or software construction which preferably resides in the image path of the device and can manipulate the digital image such that the image prints maintain color consistency and color accuracy over a production run. Various embodiments hereof are directed towards the image processing system. It should also be understood that one or more functions, features, or capabilities performed by a computer system or special purpose processor (such as an ASIC) performing one or more aspects of the present adaptive color controller, as described more fully herein, may be integrated, in whole or in part, with any system or sub-system or device controller of such a complex multifunction device.

DEFINITIONS

The term "image", as used herein, refers to a graphic or plurality of graphics, compilation of text, graphs, a contone or halftone pictorial image, or any combination or sub-combination thereof, a marker, and the like, capable of being output to an image marking or display device including a digital representation of the image. Such an image, for example, may be a combination of graphics, text, pictures, and the like, that is represented by pixel values denoting color, intensity, etc., of the particular pixels that make up the image. A subclass of images which are associated with a document image assembled by a customer. The document image may include, for instance, a test patch using target color values generated by printing application software or another type of control system, or a member of a collection of images in a database with patch layout located in a preferred region of the document to make measurements by an image sensor when printed. The target color values provide image data that, when used to display the image or convert the image to a hard copy, provides an approximate representation of the image. The target color values provide the image data to the learning controller (104 of FIG. 1) in a manner as will be more fully described herein.

The term "gamut" refers to a complete subset of colors as defined by the spectrum of light, i.e., the distribution of light energy versus wavelength, interacting with the spectral sensitivities of the eye's light receptors and the colorants on the substrate. One of the common usages refers to the subset of colors which can be accurately represented in a given circumstance, such as within a given color space or by a certain output device. Another refers to the set of colors found within an image at a given time. In this context, digitizing a photograph, converting a digitized image to a different color space, or outputting it to a given medium using a certain output device generally alters its gamut, in the sense that some of the colors in the original are lost in the transformation process. A color transformation process translates an input color space to an output color space. In conventional color management systems, a color transformation converts each input color space to an output target color space using mathematical algorithms. The mathematical algorithms of the color profiles for a color transformation may be convolved for efficiency. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors, and is limited by an amount of toner that can be deposited on the image-receiving medium.

A Lab color space is a color-opponent space with dimension L* for luminance and a* and b* for the color-opponent dimensions based on non-linearly compressed CIE XYZ color space coordinates. Lab color space is more often used as an informal abbreviation for the CIE 1976 L*a*b* color space (also called CIELAB), whose coordinates are given by {L*, a*, b*}. Chrominance (a) is the chrominance of a first channel. Chrominance (b) is the chrominance of a second channel. Luminance (L) is a photometric quantity which, in essence, is the effect of radiance on our eyes. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. Primary colors are understood to be Cyan, Magenta, Yellow, and Black. Secondary colors are understood to be Red, Green, and Blue. The functional models presented herein use a device independent color space to consistently track a set of target colors.

An "image marking device" refers to a device capable of reducing a signal of an image to viewable form. The set of such devices includes printers, xerographic devices, image production and photographic equipment, monitors and other display devices, and the like. Outputting the image means communicating information about the image to an image output device. Such communication may take the form of transmitting the image in the form of signals over a network or other communication pathway, or storing the signals to a memory or storage media for subsequent retrieval. A color marking device, such as an inkjet printer, is one example of an image output device which produces an image from the received signal onto a substrate by the visual integration of colored inks deposited thereon.

Example Color Adjustment System

Reference is now made to FIG. 1 which is a block diagram illustrating one example embodiment of the structure and functions performed by the present color adjustment system in an image marking device. Although terms such as image sensor and actuator are referred to herein in the singular, it should be appreciated that complex multifunction devices wherein the present color adjustment system finds its intended uses will likely have a plurality of image sensors and actuators, including multiple image marking models.

Reference is now made to FIG. 1 which is a block diagram shown with linear state feedback controller for color control system 100 which receives target color values $X_d$ (such as $L^*_{ref}a^*_{ref}b^*_{ref}$ or reference spectra) 102 into learning controller 104. The learning controller outputs a signal u(k) to image marking device 106. Signal 162 is an output from the image marking device to image sensor 108. The image sensor measures real color values as a feedback signal 180 to the learning controller to adjust the color control through parameter updates to actuators in the image marking device. The feedback signal is shown as being selectable by switch 160. Either the estimated/predicted color values $\hat{x}(k)=\hat{y}(k)$ (signal 172) or measured real color values x(k)=y(k) (signal 152) are used from image sensor 108. The feedback signal (described further below as filtered output from image sensor, R(λ) or L*, a*, b*) is subtracted by adder 122 to form signal e(k) which, in turn, is provided to gain matrix 124. Signal 172, representing estimated/predicted color values, and signal 152 representing measured real color values, are provided to adaptation mechanism 130.

Major components 104, 106, 108, 110, and 140 are coupled together via data communication links. These links may be any type of link that permits the transmission of data, such as direct serial connections, a local area network (LAN), wide area network (WAN), an intranet, the Internet, circuit wirings, and the like.

Learning controller 104 includes adaptation mechanism 130. The adaptation mechanism with MIMO (Multiple Input Multiple Output) uses a learning change in Jacobian (as further described with reference to Eq. (5) below) and the gain matrix computation using a nominal Jacobian matrix.

The content for a printing job (e.g., CMYK recipe for a target color) is initially provided by the customer for the desired target color values 102 in a form acceptable to the system.

Hard copy output device 106 may be any type of image marking device that is capable of outputting a hard copy of an image and may take the form of a laser printer, a bubble jet printer, an ink jet printer, a copying machine, or any other known or later developed device or system that is able to generate an image on a recording medium using the image data or data generated from the image data. The hard copy output device generates the hard copy of the image based on printable image data generated by the learning controller.

Image sensor 108 may be any type of device that is capable of detecting image data from a hard copy image and supplying the image data as detected device-independent image data or device dependent image data or post-processed image data, which may be in device-independent or in device-dependent form to the learning controller. For example, the image sensor may be an optical sensor, a spectrophotometer, a color sensor, an inline sensor, an off-line sensor, or any other known or later developed device or system that is able to measure the color values of the image data from the hard copy image output by the hard copy output device 106.

Although for the purposes of description learning controller 104 is shown as a separate device from the target color values 102, the learning controller may be an integrated device, such as a digital copier, a computer with a built-in printer, or any other integrated device that is capable of producing a hard copy image output. With such a configuration, for example, the target color values, learning controller, hard copy output device, and the image sensor(s), may be contained in a single device.

The learning controller 104 may be a separate device containing the adaptation mechanism 130 and the image sensor 108 attachable downstream of a stand-alone hard copy output device 106. For example, the learning controller and the image sensor may be a device which interfaces with both the target color values 102 and one or more hard copy output devices, as would be the case if the learning controller is incorporated into a network print server that manages printer data for a plurality of the same or different printing devices. One or more hardcopy devices may be incorporated as one integrated device as in the Tightly Integrated Parallel Printer (TIPP) or Tightly Integrated Serial Printer (TISP) configurations that is capable of producing a hard copy image output as one printing system would normally do.

Furthermore, the learning controller 104 may be implemented as software on the target color values 102 or the hard copy output device 106. The image sensor may be incorporated into the hard copy output device or may exist as a stand alone device that communicates the detected data back to the target color values. Other configurations of the elements shown in FIG. 1 may be utilized without departing from the spirit and scope of the specification and claims herein.

Target color values 102 provide image data that, when used to display the image or convert the image into a hard copy, provides an approximate representation of the image. The target color values provide the image data to the learning controller.

The image data input to the learning controller 104 may be in either a device-dependent color space or a device-independent color space. For example, if the target color values are stored in a personal computer, the image data used for representing the image is typically in the RGB color space, since this is the color space used by a display of the target color values. These RGB values may be directly forwarded to the learning controller or may undergo conversion into a device-independent color space, such as L*a*b*, prior to being input to the learning controller. If the conversion of the device-dependent color space values into device-independent color space values is not performed by the target color values when inputting the image data to the learning controller, then the learning controller may perform the conversion between the color spaces.

The learning controller transforms the device-independent image data into actuator values, which may be printable image data based on the color space used by the hard copy output device. For example, if the hard copy output device is a printer, the color space used by the printer will often be the CMYK color space. In such a case, the learning controller converts the device-independent image data into CMYK-color space printable image data for the appropriate target value. Alternatively, the learning controller can transform the device-independent image data into process actuator values, which may be setpoints to the level 2 xerographic process control system of the image marking device. When process actuators are used to actively adjust the process the CMYK values of the color control patch are not adjusted at the same time. The target values of the color control patches may be described in any of the color spaces, such as reflectance spectra, L*a*b*, CMYK, RGB, parameters describing color, sRGB, or even the color number, such as a Pantone® number.

Uncertainties or disturbances 112 are the factors responsible for variations in color output. These factors include environmental conditions, use patterns, the type of media used, variations in media, variations from original models used in initializing the hard copy output device, general wear, and the like, the colors capable of being output by the hard copy output device may not match the desired colors represented by the device-independent image data.

In the learning controller, when a hard copy of the image is output by the hard copy output device, the hard copy is placed within the field of detection of the image sensor. The image sensor generates image data from the hard copy image and transmits this image data in any of the device independent color coordinate spaces (reflectance spectra, L*a*b*, XYZ, LHC, etc.) or in device dependent spaces (CMY, CMYK, RGB, sRGB, and the like) depending on the direct output or transformed output of the sensor image data to the learning controller.

Within the learning controller, the adaptation mechanism 130 has two Jacobians; a nominal Jacobian and an updated new Jacobian. A nominal Jacobian, is obtained by analyzing data from the model under nominal conditions, as further described below with spectral principal component analysis (PCA) modeling approach. A delta Jacobian represents the unknown factors such as uncertainty, disturbance, variations of working conditions of the image marking device, and more as measured by the image sensor. The adaptation mechanism uses the delta Jacobian and the nominal Jacobian to update and adjust the gain matrix 124. The adjusted gain matrix is used in the feedback controller comprising of the new gain matrix, and the integrator 126. The output of the integrator is combined at the summing node 128 with the nominal actuator values, $u_0$, to produce new actuator values u(k). This in turn adjust the printable image data to create a revised color for the target value such that the resulting image output by the hard copy output device results in detected image data values that more closely correspond to the target image data. The implementation of the adaptation mechanism with learning Jacobian updates, at each iteration, the gain matrix.

This iteration process, that is, the process of printing, measuring, and processing through the learning controller and setting new actuator values with the updated Jacobian, the gain matrix in the feedback controller and combining the output of the feedback controller with the nominal actuator values in an iterative fashion, may be repeated a number of times until an amount of error between the detected image data and the target image data falls within an acceptable tolerance. The process may also be restricted to a preset number of iterations. Once the detected image data is within the given tolerances, and/or the maximum number of iterations has been performed, the learning controller provides the hard copy output device with the final set of actuator data usable to output the final customer image. In this way, the final customer image will more closely resemble the desired output image regardless of the particular hard copy output device that produces the final customer image. Thus, if the same customer image is to be printed by a plurality of different hard copy output devices having different attributes or different printer drifts, when this learning control system is used in each of those devices to set their respective actuator values, substantially the same final customer image will be produced by each hard copy output device regardless of the different attributes and drifts of each printing device.

The particular methods performed by the learning controller comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein. For further information describing how to make digital production printers have nearly the same gamut using a higher level Multiple Input Multiple Output (MIMO) state feedback control loop called Automated Matching with Setpoints as Actuators (AMSA), refer to U.S. patent application Ser. No. 12/352,350, entitled: "Method, Apparatus And System For Matching Color Gamuts Of Multiple Image Transfer Devices" which is hereby incorporated in its entirety by reference.

There are several methods to calculate the nominal sensitivity matrix or nominal Jacobian. One method, when CMYK values are used as actuators as in spot color control method, is printing a series of color patches for different CMYK values which are then used to determine the sensitivity matrix. Patches are scheduled with some variations (deltas) in all directions to the nominal CMYK values and the nominal sensitivity matrix is extracted from this data. Another method for calculating the nominal Jacobian is by using a pre-calculated number of patches that are printed each time when the sensitivity measurements are initiated. Patches are scheduled to build an input-output model such as the Neugebauer model, a sensitivity matrix is extracted for any color inside the printer gamut. These patches could be simply those used during the characterization process of a printer which may build the parameters required for updating the Neugebauer model. The spectral reflectances of the color patches and primary colors as read by the spectrophotometer sensor are utilized to generate dot growth functions for each of the separations and primary correction curves using Neugebauer concepts. Once the optimum set of dot growth functions and appropriate corrections are found, the model can then be used as a "surrogate printer" to generate the sensitivity matrix. Examples of calculating sensitivity matrix are described in co-pending U.S. patent application Ser. No. 12/024,221 entitled "Sensitivity Matrix Determination For Adaptive Color Control", by: Lalit K. Mestha, and commonly assigned to the Xerox Corporation, which is incorporated herein in its entirety by reference. Generally, Neugebauer methods do not yield a good sensitivity matrix due to inaccuracies in the models employed. Hence other methods described herein further are considered more appropriate for accurate determination of nominal sensitivity matrix. Particularly, when actuators are used as inputs to signal line 162, Neugebauer based modeling methods do not give sensitivity matrix between color outputs to actuator inputs.

High Level Overview of Learning Controller

The self-learning control model hereof utilizes principal components as spectral basis vectors. This is understood to be a distributed color model. In this system, the inputs are process actuators (e.g., DMA setpoints for level 2 controls; or low, mid and high DMAs for C, M, Y and K separations; or Vgrid, Vexposure, Vdonor, each for individual separations, for xerographic process; or CMYK values for color). The outputs are spectral data of selected color control patches (e.g., red, green, blue and neutral color in the 1617 IT8 color set). Unlike prior feedback controllers, the gains hereof are updated from its nominal values automatically with the learning controller. The present self-learning algorithm is based on learning theory. The gain matrix is updated by learning the Jacobian matrix from the in-line spectrophotometer (ILS) data and provides actuations to process inputs so that colors are held stable as prints are made at production speed. When same control targets are used across devices, this approach also provides similar color gamuts across a wide variety of different devices.

To develop a learning control system, modeling is considered extremely important. Particularly for process control loops, e.g., for higher level AMSA loops, a nominal Jacobian matrix, i.e., the first order sensitivity between inputs and outputs, for each test color is needed, which is static, is normally constructed based on experimental data on a fleet printer. Herein, a distributed process modeling approach is used in which the spectral model for individual color control patches is constructed with the spectral/color data. The static Jacobian matrix is updated over time from spectral data from the sensor. The updated Jacobian matrix is then used to modify the gain matrix in the controller thus making the system adaptive.

There are two parts to the model. A first part is a static nominal model constructed in the factory. It is a one-time process based upon the chosen structure. The model for a nominal machine is derived from the experimental data on a sample printer for the color control patches, e.g., red, green, blue and neutral color in the 1617 IT8 color set. The second part uses the adaptation algorithm implemented in the print engine as part of the real-time control system. It is a timevarying part, which provides learning from measurement differences in environment, media, halftones, printing technologies, etc.

An Example Distributed System

Figure 2:
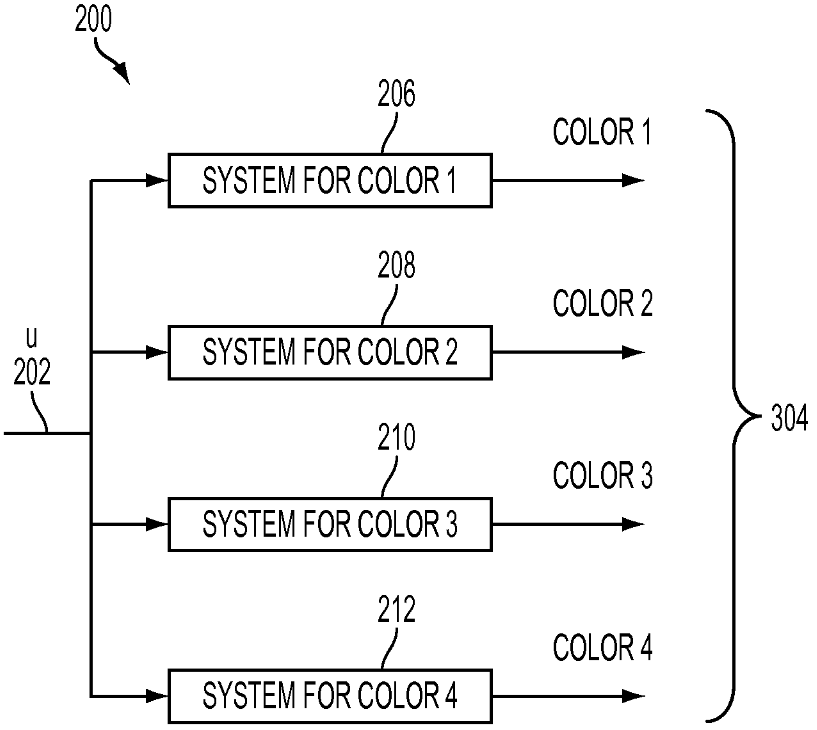
FIG. 2 is a functional block diagram of an example distributed system (shown conceptually after PCA reduction in spectral space)

Reference is now made to FIG. 2 which is a block diagram of a distributed system shown conceptually after PCA reduction in spectral space.

Block diagram 200 is a representation of the decentralized or a distributed or a multi-model open loop color system. Each system represents the process model for individual color 206, 208, 210, and 212 and is interconnected serially at the inputs 202 from learning controller 140. This is a distributed Principal Component Analysis (PCA) model, included in the learning controller, which is generally considered to be more accurate than other models. In the distributed configuration, each color is parameterized independent of the other and finally represents the color as outputs as a function of the input, i.e., the input line connecting to 106 in FIG. 1. Spectral basis vectors are constructed a priori for the color control patches. It is to be noted that the color control patches can also be spot colors. They are held static and used as natural functions. Only parameter matrix will be different and is represented as a function of the inputs 202.

The following describes how a parameterized PCA based spectral model is constructed for a single color from experimental data for a variety of actuator setpoints and corresponding image sensor data. From this model, a nominal Jacobian matrix is computed. Parameter matrix, Jacobian matrix, spectral basis vectors, and spectral values, are carried as lookup tables for field updates.

First, perform input-output experiments for various actuator combinations. Print and measure, the color control patches (e.g., red, green, blue, and neutral color in the 1617 IT8 color set) and store their spectra during each experiment. From the input-output experimental data, we get:

(1) Actuator values (inputs): $u_{mi}=[\check{u}_{1i}, \ldots, \check{u}_{mi}]^* \in R^m$, for $1 \le i \le n$, where n represents number of experiments and m represents number of independent actuators, and where $\check{u}_{mi}$ represents individual actuator values for the input vector, $u_{mi}$. The '*' above represents the transpose of the vector. Each experiment contains setting values to m number of actuators in the input-output experiment. When DMA targets are used as actuators, input vector, $u_{mi}$, represents DMA values. If we use Corotron grid voltage, exposure intensity, and donor roll voltage as the actuators, then the input data represents those actuators. As an example, consider the targets $DMA_{high}$ for Cyan, $DMA_{high}$ for Magenta, $DMA_{high}$ for Yellow and $DMA_{high}$ for black as four different actuators. In this case, m=4. These actuators will have a lower limit and an upper limit. If we consider a 2 level, full factorial design, then we will have conducted a total of: $n=2^4=16$ number of experiments (or actuator combinations) to cover all combinations of lower and upper values of the four different actuators. If we consider a 3 level, full factorial design, then a total of: $n=3^4=81$ number of experiments will be performed to cover all combinations of lower, nominal (or mid point) and upper actuator values.

(2) Measured spectrum for N color patches: $R_{ij}(\lambda) \in R^{31}$, for $1 \le j \le N$ and $1 \le i \le n$, ($R_{ij}$ is the spectra of the $j^{th}$ color patch for $i^{th}$ experiment with the input vector set to $u_{mi}$).

Next, the nominal model is derived between the input $u_{mi}$ and the output $R_{ij}$ for the color patch j. Let:

$$R_{0j}(\lambda) = \frac{1}{n}\sum_{i=1}^{n} R_{ij}(\lambda) \tag{1}$$

and the covariance matrix formed by the measured spectral data is:

$$\Sigma_j = \frac{1}{n}\sum_{i=1}^{n} (R_{ij} - R_{0j})(R_{ij} - R_{0j})^* \tag{2}$$

In the above summation, a '*' represents a matrix transpose. For convenience, wavelength λ is not shown.

When the spectral data is captured at 31 wavelengths (400 nm to 700 nm at 10 nm intervals), the covariance matrix will be of size 31×31. The modeling approach for 31 wavelength spectral data will next be described.

By the singular value decomposition, we derive:

$$\Sigma_j = \Psi_j \Pi_j \Psi_j^* \tag{3}$$

where $\Pi_j$ is a diagonal matrix, $\Psi=[\Psi_{1,j}, \ldots, \Psi_{31}]$, is an orthogonal matrix (also called basis vector matrix) with 31 basis vectors. Individual basis vectors $\Psi, \ldots, \Psi$ are of size 31×1 and are orthogonal to each other. The orthogonal matrix operation, $\Psi^*\Psi=I$, (identity matrix).

Let $\alpha_{ij}$ is the weight vector, which can be written in terms of orthogonal basis vectors as follows:

$$\alpha_{ij}=[\alpha_{ij}^1, \ldots, \alpha_{ij}^{31}]^* = \psi^*_j(R_{ij}-R_{0j}), \text{ for } 1 \le j \le N \tag{4}$$

Note the superscript 1, . . . , 31 in $\alpha_{ij}$ represent the weights at wavelengths 400 nm to 700 nm at 10 nm interval. It does not mean raised to the corresponding power.

Spectra $R_{ij}$ can be expressed in terms of the sum of the mean spectra and the weighted sum of the dominant basis vectors as follows:

$$R_{ij}(\lambda) = R_{0j}(\lambda) + \Psi_j(\lambda)\alpha_{ij} = R_{0j}(\lambda) + \sum_{k=1}^{31} \alpha_{ij}^k \psi_{kj}(\lambda) \tag{5}$$

If there are only few, $K_j<31$, dominant Eigenvalues, then only few, $K_j$, spectral basis vectors are needed to estimate the spectra $R_{ij}$. If the combination of $K_j$ basis is chosen to approximate $R_{ij}$, then:

$$R_{ij} \cong R_{0j}(\lambda) + \sum_{k=1}^{K_j} \alpha_{ij}^k \psi_{ij}(\lambda) \tag{6}$$

In some situations, it is difficult to know how to choose $K_j$. Here $K_j$ is assumed to be known. An algorithm on how to select $K_j$ is provided herein further.

It is to be noted that number of dominant basis vectors $K_j$ may be equal or different for different color control patches. First $K_j$ spectral basis vectors are dominant basis vectors with most dominant being Ψ and least dominant being $\psi_{K_j}$. The term $\alpha_{ij}$ can be considered as linear functions of actuator values (i.e., input $\check{u}_{mi}$) as follows:

$$[\alpha_{ij}^1, \ldots, \alpha_{ij}^{K_j}] = [1, \check{u}_{1i}, \ldots, \check{u}_{mi}]\theta_{0j} + \epsilon_{ij} \tag{7}$$

where $\theta_{0j}$ is a constant matrix of size $(m+1)\times K_j$, $\epsilon_{ij}$ is an approximation error. It should be appreciated that the matrix $\theta_{0j}$ will be different for different color control patches. For one color control patch, and n distinct number of experiments, we have:

$$y^*_j = A_{0j}\theta_{0j} + \epsilon^*_j \tag{8}$$

where $\epsilon^*_j = [\epsilon_{1j}, \ldots, \epsilon_{nj}]^*$, and $$y_{*j} = \begin{bmatrix} \alpha^1_{1j} & \ldots & \alpha^{K_j}_{1j} \\ \vdots & \vdots & \vdots \\ \alpha^1_{nj} & \ldots & \alpha^{K_j}_{nj} \end{bmatrix}, \tag{9}$$

$$A_{0j} = \begin{bmatrix} 1 & \breve{u}_{11} & \ldots & \breve{u}_{m1} \\ \vdots & \vdots & \vdots & \vdots \\ 1 & \breve{u}_{1n} & \ldots & \breve{u}_{mn} \end{bmatrix}.$$

If $\epsilon^*_j$ is a white noise vector and $A_{0j}$ has full rank with the aid of the least square we have:

$$\theta_{0j} = (A^*_{0j}A_{0j})^{-1}A^*_{0j}y^*_j \tag{10}$$

It is to be noted that the experimental design must lead to actuator combinations with $A_{0j}$ as full rank. If we use orthogonal design as in Design of Experiments (DoE) methodology such as those described in: "*Understanding Industrial Designed Experiments*", by: Stephen R. Schmidt and Robert G. Launsby, 4th Ed., (2005), ISBN-10: 1880156032, which is incorporated in its entirety by reference. Design of Experiments methodologies can drastically reduce the number of experiments with maximum orthogonality among actuator vectors, while the important interactions between actuators can be retained in the model.

With the aid of $\theta_{0j}$, the spectra of the color control patch for any given input within their upper and lower limits can be predicted. For example, for the $j^{th}$ color control patch, assume the actuator inputs, $u=[1, \breve{u}_1, \ldots, \breve{u}_m]^*$, then the predicted spectra can be calculated in two steps. In the first step, the weight vector is calculated using $\theta_{0j}$ and inputs:

$$\alpha^* = [\alpha^1, \ldots, \alpha^{K_j}] = [1, \breve{u}_1, \ldots, \breve{u}_m]\theta_{0j}. \tag{11}$$

In the second step, the predicted spectra R is calculated as follows:

$$R = R_{0j} + \sum_{k=1}^{K_j} \alpha^k \psi_{kj} \tag{12}$$

Eqs. (11)-(12) are called the spectral PCA (Principal Component Analysis) model or prediction model of the printer for color control patch j. This model is included in the learning controller 140 of FIG. 1. The parameter matrix, $\theta_{0j}$, the mean spectra, $R_{0j}$, and the basis vector matrix, $\Psi_j=[\Psi, \ldots, \Psi]$, are carried as parameters of the Spectral PCA model in the learning controller 140 of FIG. 1. It is to be noted that these parameters may be specific to media and halftone screens.

With the aid of prediction equations (Eqs. (11)-(12)), the following may be used to choose the number ($K_j$) of the dominant Eigenvalues.

Example Algorithm to Choose $K_j$

1. Given a tolerable error $\delta_j$ for color patch j in L*a*b* space (for a known light source and observer) and set $K_j=31$;
2. $K_j \leftarrow K_j-1$, calculate matrix $y^*_j$ and $A_{0j}$ in Eq. (9);
3. Calculate $\theta_{0j}$, using Eq. (10);
4. For given inputs, calculate predicted spectrum R using Eqs. (11)-(12);
5. Calculate predicted L*a*b* values $\hat{z}=[\hat{l}, \hat{a}, \hat{b}]^*$ and the measured L*a*b* values $z_j=[l, a, b]^*$;
6. If $\Delta E_{2k}$ between the predicted L*a*b* values and the measured L*a*b* values is less than $\delta_j$ for each input, go to Step 2. Otherwise, go to Step 7;
7. Stop. The value of $K_j+1$ is the number of the dominant Eigenvalues.

Other metrics such as mean square error instead of $\Delta E_{2k}$ may be applicable while choosing the number of spectral basis vectors, $K_j$.

Approximation Errors

Reference is now made to FIG. 5 which is a graph (a to d) that shows approximation errors (mean square) for four test color control patches with respect to number of spectral basis vectors as follows:

a) color control patch 255, 255, 0, 0;
b) color control patch 0, 255, 255, 0;
c) color control patch 255, 0, 255, 0;
d) color control patch 153, 114.75, 114.75, 102.

The errors go down to nearly near zero when the number of spectral basis vectors, $K_j$, is near 10.

For four color patches, the outputs of the printer based on the PCA model are:

$$R_j = R_{0j} + \sum_{i=1}^{K_j} \alpha^i_j \psi_{ij}, \quad 1 \le j \le 4 \tag{13}$$

where $\alpha^i_j$ is calculated by Eq. (11) with certain input vector $[\breve{u}_1, \ldots, \breve{u}_m]$ which is now a function of the actuators. Eq. (13) is a parameterized PCA based spectral model with respect to actuators for the $j^{th}$ color control patch. It is to be noted that the color control patch can also be regarded as the spot color patch. Similarly a parametric spectral PCA model of Eq. (13) is constructed for the remaining color control patches using similar spectral PCA approach with different basis vectors and parameters modeled by Eq. (11) as a function of the actuators.

Figure 3:
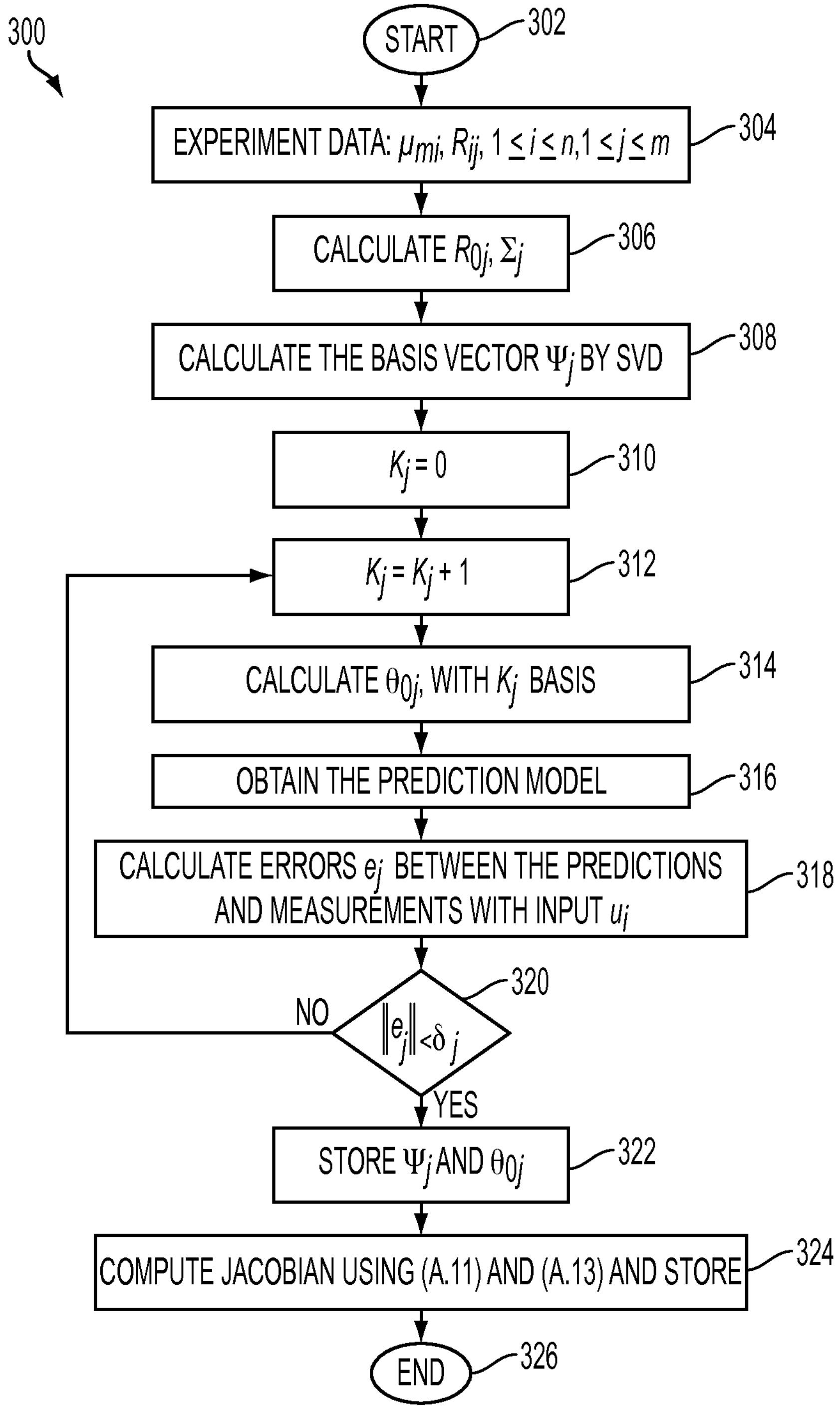
FIG. 3 is flow diagram of one example embodiment hereof which utilizes a printer modeling approach.

Reference is now made to FIG. 3 which is a flow diagram 300 of a printer modeling approach for a learning color control system shown for $j^{th}$ color control patch.

The process begins at step 302 and immediately proceeds to step 304 where experimental data from image marking system 106 (output of sensor 108) for different experiments represented by the notation i are used to calculate a nominal spectra $R_{0j}$ and $\Sigma_j$ covariance matrix, respectively in step 306. In step 308, basis vector matrix, $\Psi_j$, is obtained by singular value decomposition (SVD). A loop in step 310 begins for determining number of basis vectors, $K_j$, with $K_j$ set to zero and incremented each time through loop in steps 312 and 314. A constant matrix $\theta_{0j}$ is calculated with $K_j$ basis. Prediction model in step 316 is calculated using Eqs. (11)-(12) above.

In step 318, errors $e_j$ between predicted and measured spectral values is calculated and test made in step 320 whether the absolute error is within a given range $\delta_j$. In the event it is not within range, the process loops back to step 312. Otherwise, the values for the basis matrix and parameter matrix are stored in step 322, and, in step 324, Jacobian matrix, J, is calculated (shown below). The flow proceeds to step 326 to end. The Jacobian matrix can be in spectral space or in L*a*b* space. It is obtained as follows.

When the Jacobian matrix, J, is in spectral space, perform the numerical differentiations of spectral reflectance at each wavelengths using Eq. (6) with respect to actuator values. It is to be noted that when the Jacobian matrix is represented by the notation $J_j$, it means the Jacobian matrix is for the $j^{th}$ color control patch. If the control needs are to perform control of L*a*b* values (for example, for 2 degree observer and D50 light source) then convert the spectra from Eq. (13) to L*a*b* values. Build the Jacobian matrix from the model. Eq. (14) below shows one example of the Jacobian matrix, J, in L*a*b* space when m number of actuators are used. On the other hand when the Jacobian matrix is represented by the notation J (i.e., without the suffix j) then it will be conveniently represented for a group of color control patches (more than one) as shown by Eq. (15). Numerical values of the matrix are shown in Eq. (16) for four color control patches and 11 actuators.

For color control patch j, the Jacobian matrix is of size 3×m and is given by:

$$J_j = \begin{bmatrix} \frac{\partial L_j^*}{\partial u_1} & \frac{\partial L_j^*}{\partial u_2} & \cdots & \frac{\partial L_j^*}{\partial u_m} \\ \frac{\partial a_j^*}{\partial u_1} & \frac{\partial a_j^*}{\partial u_2} & \cdots & \frac{\partial a_j^*}{\partial u_m} \\ \frac{\partial b_j^*}{\partial u_1} & \frac{\partial b_j^*}{\partial u_2} & \cdots & \frac{\partial b_j^*}{\partial u_m} \end{bmatrix}_{3\times m} \quad (14)$$

For a group of four color control patches the Jacobian matrix J is of size (3×4)×m and is given by:

$$J = \begin{bmatrix} \frac{\partial L_1^*}{\partial u_1} & \frac{\partial L_1^*}{\partial u_2} & \cdots & \frac{\partial L_1^*}{\partial u_m} \\ \frac{\partial a_1^*}{\partial u_1} & \frac{\partial a_1^*}{\partial u_2} & \cdots & \frac{\partial a_1^*}{\partial u_m} \\ \vdots & \vdots & \vdots & \vdots \\ \frac{\partial b_4^*}{\partial u_1} & \frac{\partial b_4^*}{\partial u_2} & \cdots & \frac{\partial b_4^*}{\partial u_m} \end{bmatrix}_{12\times m} \quad (15)$$

For a group of four color control patches and 11 actuators the Jacobian matrix J is of size (3×4)×11.

$$J = \begin{bmatrix} 24.6 & -12.1 & -1.5 & -14.5 & -27.6 & -1.2 & -6.5 & 7.6 & 0.1 & -11.8 & -2.8 \\ -25.3 & -7.8 & -9.2 & 14.6 & 81.9 & 6.5 & -16.2 & -1.4 & -2.1 & -8.0 & 2.5 \\ -25.2 & -21.7 & -16.3 & 13.1 & 13.4 & 6.0 & 19.4 & -14.0 & -1.1 & 18.2 & -1.4 \\ -66.2 & 0.8 & -1.5 & -9.3 & -17.1 & -12.8 & -29.8 & -5.8 & 2.0 & 3.8 & 0.7 \\ 72.1 & 57.7 & -2.4 & -53.5 & 3.1 & 23.3 & -34.6 & 1.9 & 9.6 & 10.2 & 6.8 \\ -32.0 & 63.7 & -4.8 & -13.7 & -24.3 & -19.1 & -86.1 & -16.6 & 54.3 & 18.7 & 16.8 \\ -7.2 & -38.6 & -14.5 & 1.0 & 2.0 & 0.4 & -1.2 & 9.3 & 1.1 & -7.6 & -0.6 \\ 2.9 & -45.9 & -18.2 & 0.8 & 0.8 & 3.1 & -26.0 & 17.7 & 6.5 & -12.9 & -3.7 \\ 114.9 & 1.3 & -21.3 & 52.0 & 1.6 & 10.6 & -54.9 & 31.6 & 58.4 & -9.3 & 10.1 \\ 42.9 & -25.2 & 2.6 & -39.1 & -22.9 & -1.0 & -5.4 & 14.4 & 1.7 & -37.9 & -0.3 \\ -52.1 & -44.8 & -9.1 & 90.9 & 57.3 & 4.0 & -14.5 & -30.6 & -3.1 & 39.6 & 0.5 \\ -57.3 & -48.1 & -6.1 & 13.9 & -4.1 & 2.4 & 55.9 & 33.6 & -4.6 & 1.0 & -13.9 \end{bmatrix} \quad (16)$$

For spectral output with 31 wavelengths of four color control patches and 11 actuators, the spectral Jacobian matrix J will be of size (31×4)×11. No examples of the spectral Jacobian matrix are shown in this application since its size is too large.

It is to be noted that the Jacobian matrix can be the Jacobian for all wavelengths for a given color or for merely the L*a*b* values. When using the Jacobian matrix for L*a*b* values, the control system has been deliberately restricted to one illuminant (e.g., D50 light source) and one observer (e.g., 2 degrees).

Described in the following sections is how the learning algorithm updates the spectral Jacobian matrix for the $j^{th}$ color control patch.

The learning algorithm described below is used to update the nominal Jacobian matrix and hence the gain matrix. The parameterized input-output model for one color control patch j and a nominal printer state can be written as (from Eq. (11)). That is:

$$\alpha^* = [\alpha^1, \ldots, \alpha^{K_j}] = [1, \check{u}_1, \ldots, \check{u}_m]\theta_{0j}. \quad (17)$$

The reflectance spectra of the $j^{th}$ color control patch for the nominal printer was modeled in terms of the spectral basis vectors by Eq. (5).

Now, when the printer changes in the field during print run, the new reflectance spectra (e.g., sensor 108 output) can be modeled in terms of basis vectors by an additive term as follows:

$$R = R_{0j} + \sum_{i=1}^{K_j} \alpha^i \psi_{ij} + \Phi^*(u)\beta \quad (18)$$

where Φ(u) is a known matrix comprising functions of inputs $u = [\check{u}_1, \ldots, \check{u}_m]^*$, and β is a vector to be updated online with measurement data and represents the delta Jacobian matrix to be determined from the sensor data during real-time updates. The parameter matrix $\theta_{0j}$, the mean spectra $R_{0j}$, and the basis vector matrix, $\Psi = [\Psi, \ldots, \Psi]$, are carried as parameters from learning controller 140.

For convenience, $\Phi(u) = \text{diag}[\Phi_1(u), \ldots, \Phi_{31}(u)]$, for 31 wavelengths, is chosen with each component functions modeled as a general function of the inputs. For AMSA system a linear function (Eq. (19) below) is assumed, which is adequate for our purpose. Then, $$\Phi^*(u)\beta = \begin{bmatrix} \varphi_1^*(u)\beta_1 \\ \vdots \\ \varphi_{31}^*(u)\beta_{31} \end{bmatrix} \quad (19)$$

Assume at iteration step k the input to the printer is u(k) and the spectral measurement for a color patch j is $y(k)\epsilon R^{31}$. The learning algorithm for the β vector is constructed using the theory described in, "*On Critical Stability of Discrete-Time Adaptive Nonlinear Control*", IEEE Trans. on Automatic Control, Vol. 42, No. 11, pp. 1488-1499, (1997), which is hereby incorporated by reference in its entirety:

$$\beta_i(k+1)=\beta_i(k)+\alpha P_i(k+1)\phi_i(y(k+1)-\hat{y}(k))-\phi^*_i(u(k))\beta_i(k)) \quad (20)$$

where for a color printer, the spectra of a color patch can be considered as two parts: a known part and unknown part. The known part is obtained by analyzing data from the model which is under nominal condition. The learning part is used to capture the spectra generated by unknown factors such as uncertainty, disturbance, variations of working conditions, etc., and $$P_i(k+1) = P_i(k) - \frac{\alpha P_i(k)\varphi_i(u(k))\varphi_i^*(u(k))P_i(k)}{1+\alpha\varphi_i^*(u(k))P_i(k)\varphi_i(u(k))}, \quad (21)$$
$$P(0) > 0$$

where k represents the $k^{th}$ computation, α>0, ŷ(k) is the predicted spectra from the spectral PCA model, the output of Eq. (12) for corresponding u(k). Therefore, at k-th iteration cycle, the model with the learning part for the output of the printer in its new state becomes:

$$R(k) = R_{0j} + \sum_{i=1}^{kj} \alpha^i \psi_{ij} + \Phi^*(u(k))\beta(k) \quad (22)$$

where $\beta(k)=[\beta^*_1(k), \ldots, \beta^*_{31}(k)]^*$ is calculated by Eqs. (17)-(18). For simplicity the wavelength λ is omitted in Eq. (22). $\beta^*_1(k), \beta^*_2(k), \ldots$ denote the best estimated values of the elements in β vector. This can capture the variation of the printer from its nominal model and make the updated model always approximate the real printer model.

Eq. (22) can be rewritten in matrix form. If $\phi_j=[1, \breve{u}_1, \ldots, \breve{u}_m]^*$, for 1≤j≤31, is chosen, then Eq. (22) contains a linear model, and:

$$\begin{aligned} R(k) &= R_{0j} + \left(\psi_j\begin{bmatrix}\theta_{0j}^* \\ 0\end{bmatrix} + \begin{bmatrix}\beta_1^* \\ \vdots \\ \beta_{31}^*\end{bmatrix}\right)\begin{bmatrix}1 \\ u\end{bmatrix} \\ &= R_{0j} + M_{0j} + (J_{0j} + \Delta J_j)u \end{aligned} \quad (23)$$

where symbol '0' is a $(31-K_j)\times(m+1)$ matrix with all elements zero, $\Delta J_j$ is the resultant matrix of $[\beta_1, \ldots, \beta_{31}]^*$ after removing the first column.

$$M_{0j}=\psi_j\theta^*_{0j} \quad (24)$$

The Jacobian matrix consists of the known part $J_{0j}$ (a nominal Jacobian matrix in spectral space), and an unknown part $\Delta J_j$ (the delta Jacobian matrix in spectral space) which is to be updated from the measurement data.

If the Jacobian matrix has to be converted to L*a*b* output, then the spectra should be converted to L*a*b* space first by a known nonlinear transformation. After that, the Jacobian matrix between the inputs and the outputs in L*a*b* space is obtained using the chain rule of differentiation.

If the Jacobian matrix of the nonlinear part is $J_R^{lab}$, then the updated Jacobian matrix in L*a*b* space is given by following:

$$J_j=J_R^{lab}(J_{0j}+\Delta J_j) \quad (25)$$

where the matrix $J_{0j}$ is the nominal Jacobian matrix and $J_j$ is the Jacobian matrix for control patch j. Jacobian matrix for multiple color control patches, J, is obtained by accumulating each matrix for the $j^{th}$ control patch.

Example Flow Diagram

Figure 4:
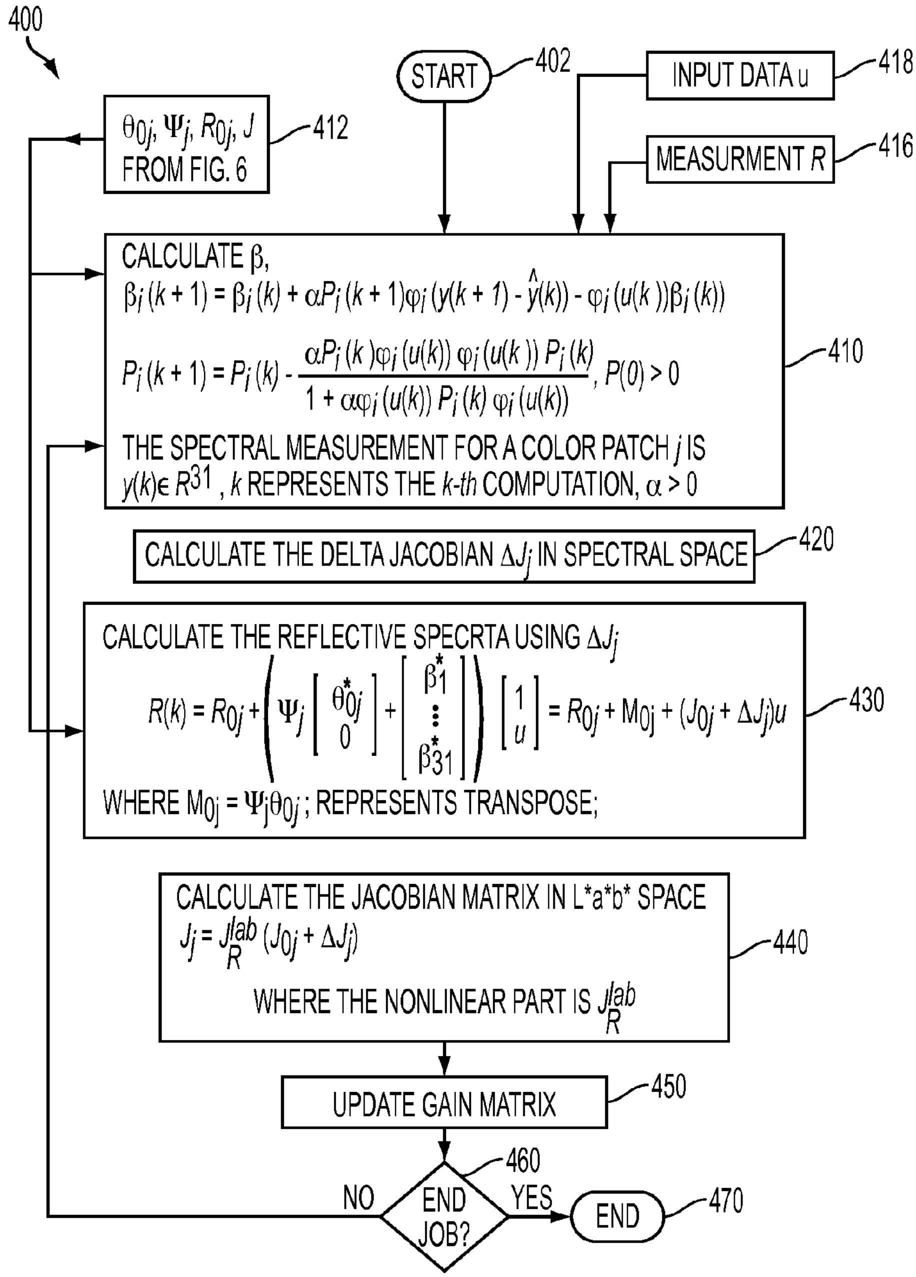
FIG. 4 is a flow diagram of one example embodiment which utilizes an on-line updating algorithm for one sample test color.
Figure 5A:
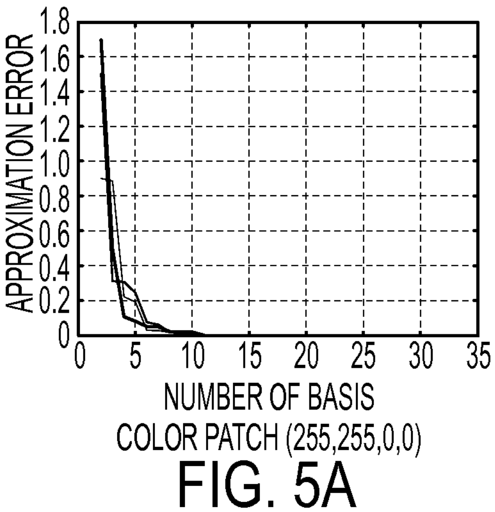
FIG. 5 is a series of graphs (labeled A-to-D) which collectively show approximation errors for four test patches with respect to a number of spectral basis vectors.
Figure 5B:
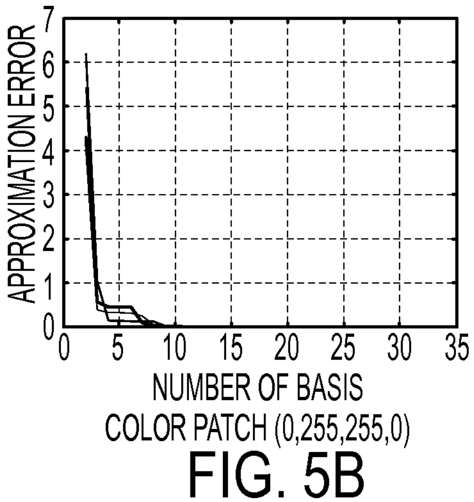
Figure 5C:
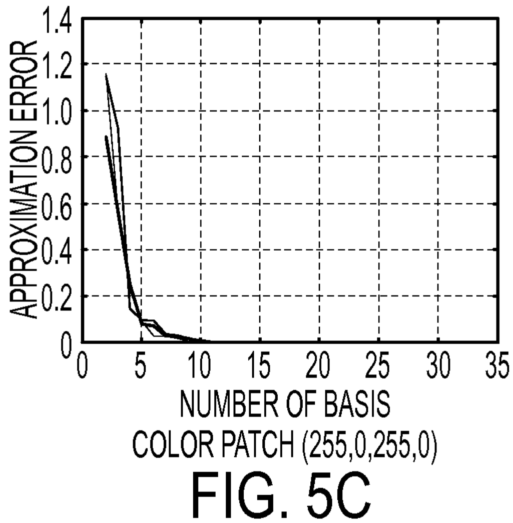
Figure 5D:
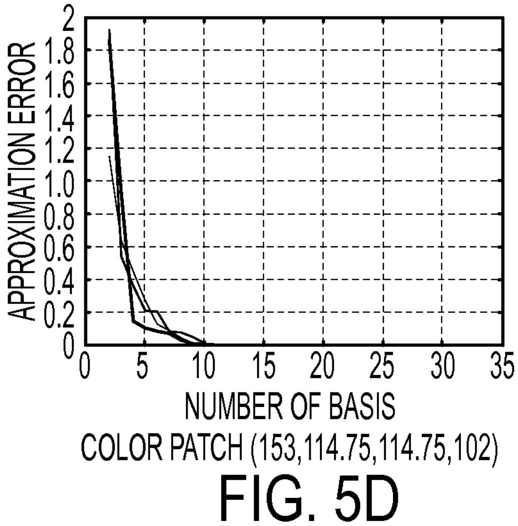

Reference is now made to FIG. 4 which is a flow diagram 400 of the on-line updating algorithm (i.e., learning controller) for one sample test color.

At step 402 and immediately proceeds to step 410 to calculate β. Nominal parameters 412 are described in FIG. 1 (item 110). Quantities, $\theta_{0j}$, Ψ, $R_{0j}$, J are, respectively, parameter matrix, spectral basis vectors, mean reflectance spectra and the nominal Jacobian matrix. These come from the in-factory print engine data, such as image marking model(s) 140. Output from learning controller 104 to image marking device (shown as input data 418) and the measurement from image sensor(s) 108 (at 416) are provided as input to step 410 for the calculation of β. The calculation in step 410 corresponds to Eqs. (20)-(21).

As stated above, the Jacobian matrix consists of two parts a known part, which is the nominal Jacobian matrix $J_{0j}$, and an unknown part which is the delta Jacobian $\Delta J_j$. In step 420, a delta Jacobian is calculated and, in step 430, the Jacobian J is calculated in spectral space using Eq. (23) above along with nominal parameters 412. Note, the nominal Jacobian matrix is denoted $J_j$ for control patch$_j$. Next, in step 440, the Jacobian matrix is calculated in L*a*b* space using Eq. (25) above and the gain matrix updated in step 450. A test in step 460 determines if the process continues returning to the calculated β step 410 or ending at step 470.

The learning control parameter, such as a feedback gain matrix 124 has a design as described in Chapter 5 of the above-referenced text: "*Control of Color Imaging Systems: Analysis and Design*".

The gain matrix 124 feeds signal $v_j(k)$ to integrator 126 to produce signal $u_j(k)$ and fed into adder 128. Nominal actuators $u_0$ can be obtained several ways. For a AMSA type control system nominal actuators are nominal DMA set points. They can be designed at the factory. These can be generated using internal process control system using optical sensors with a one time diagnostic procedure (e.g., DC951 setup procedure as in iGen3 system). Other methods include running optimization procedure as described in U.S. patent application Ser. No. 12/352,350 entitled "Method, Apparatus, and System for Matching Color Gamuts Of Multiple Image Transfer Devices", by: Lalit Keshav Mestha, Prudhvi Krishna Gurram, Alvaro Enrique Gil, Palghat Ramesh, which is incorporated in its entirety by reference hereinto.

Simulations were performed to check the effectiveness of the present method. Extensive simulations verify that the on-line learning model can capture the variations of the printer from its nominal quickly and can provide good control of the process. When the controller gain matrix is updated based on the learning algorithm, closed loop performance of the printing system will be robust to process uncertainties.

TABLE I

| | Iterations | | | | | |
|---|---|---|---|---|---|---|
| IT8 | 1 | 2 | 3 | 4 | 5 | 6 |
| Δ ECIELab for IT8 colors | | | | | | |
| Mean | 3.5 | 3.1 | 1.1 | 0.5 | 0.2 | 0.1 |
| 95% | 4.1 | 3.5 | 1.2 | 0.6 | 0.25 | 0.12 |
| Max | 5.3 | 3.7 | 1.4 | 0.7 | 0.3 | 0.14 |
| Δ E2k for IT8 colors | | | | | | |
| mean | 3.8 | 3.2 | 1 | 0.6 | 0.25 | 0.12 |
| 96% | 4.4 | 3.3 | 1.1 | 0.7 | 0.3 | 0.14 |
| Max | 5 | 3.5 | 1.2 | 0.75 | 0.35 | 0.16 |

The above Table 1 illustrates tracking error statistics between desired L*a*b* and simulated L*a*b* with uncertainty and learning Jacobian for all IT8 color patches. These patches have numerous single separation and multi-separation color patches. Control is performed with only 4 color control patches. Reduction in ΔE CIELab and ΔE2k numbers for IT8 colors with respect to iterations demonstrate that the control loop operating with merely four color control patches can make other colors in the printing system converge to their respective targets.

Various Non-Limiting Implementations

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims. It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions. Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general-purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media containing machine readable instructions, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that variety of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for adaptive color control in a color adjustment system of a color marking device, the method comprising:

receiving at least one target color value of a target color patch for a marking job on a color control system of a color marking device, said color control system controlling m actuators wherein individual actuator values can be represented by an input vector-u;

receiving an initial sensitivity of a nominal actuator, said initial sensitivity having been determined by checking said actuator over a range said actuator is expected to vary to control color consistency of said target color value of said color control system;

receiving at least one control parameter determined using said initial sensitivity, said control parameters being used to control color in said color marking device; and iteratively performing, during said marking job on said color control system, each of the following until adjustment to said actuators is within a given tolerance:

measuring, using an image sensor, spectra for N reproduced color patches of said target color, where $R_j$ is the measured spectra of the $j^{th}$ color patch;

determining a change in sensitivity of said measured spectra, said changing in sensitivity being used to update a spectral PCA-based model of said color control system, where:

$$R=R_{0j}+\Sigma_{i=1}^{K_j}\alpha^i\psi_{ij}+\phi^*(u)\beta$$

where R is a predicted spectra, $R_{0j}$ is a mean measured spectra, $K_j$ is a user-selected number of dominant basis vectors $\psi_{ij}$, $\alpha^i$ is a basis vector written as a function of said input vector u of individual actuator values, and $\phi^*(u)\beta$ collectively comprises a learning algorithm where $\phi^*(u)$ is a known matrix of functions of said input vector u, and $\beta$ is a vector;

updating said received control parameters based upon said updated spectral PCA-based model; and communicating said updated control parameters to said color control system, said color control system using said updated control parameters to adjust said actuators for adaptive color control.

2. The method of claim 1, wherein said received initial sensitivity comprises, at least in part, a parameter matrix, a set of basis vectors, a nominal reflectance spectrum, and a nominal Jacobian matrix.

3. The method of claim 1, wherein determining said change in sensitivity comprises using a spectral principal component based color model.

4. The method of claim 1, wherein said control parameter is created from experimental data for an image forming device.

5. The method of claim 1, wherein updating said control parameter includes deriving a Jacobian matrix comprising at least a nominal Jacobian matrix in spectral space, and a delta Jacobian in spectral space which has been updated using said measured spectra.

6. The method of claim 5, wherein said nominal Jacobian matrix in spectral space is extracted from a model for an image marking device.

7. The method of claim 1, wherein, in response to DMA targets being used as said actuators, said input vector $u_{mi}$ representing DMA values and wherein, in response to a Corotron grid voltage, exposure intensity, and donor roll voltage being used as said actuators, said input vector $u_{mi}$ being input data which represents those actuators.

8. The method of claim 1, wherein said actuators comprise any of: values of a level 2 xerographic subsystem, and set points of a level 2 xerographic process control system.

9. A system for adaptive color control in a color adjustment system of a color marking device, the system comprising:

a memory;

a storage medium for storing data; and a processor in communication with said storage medium and said memory, said processor executing machine readable instructions for performing the method of:

receiving at least one target color value of a target color patch for a marking job on a color control system of a color marking device, said color control system controlling m actuators wherein individual actuator values can be represented by an input vector u;

receiving an initial sensitivity of a nominal actuator, said initial sensitivity having been determined by checking said actuator over a range said actuator is expected to vary to control color consistency of said target color value of said color control system;

receiving at least one control parameter determined using said initial sensitivity, said control parameters being used to control color in said color marking device; and iteratively performing, during said marking job on said color control system, each of the following until adjustment to said actuators is within a given tolerance:

measuring, using an image sensor, spectra for N reproduced color patches of said target color, where $R_j$ is the measured spectra of the $j^{th}$ color patch;

determining a change in sensitivity of said measured spectra, said changing in sensitivity being used to update a spectral PCA-based model of said color control system, where:

$$R=R_{0j}+\Sigma_{i=1}^{K_j}\alpha^i\psi_{ij}\phi^*(u)\beta$$

where R is a predicted spectra, $R_{nj}$ is a mean measured spectra, $K_j$ is a user-selected number of dominant basis vectors $\psi_{ij}$, $\alpha^i$ is a basis vector written as a function of said input vector of individual actuator values, and $\phi^*(u)\beta$ collectively comprises a learning algorithm where $\phi^*(u)$ is a known matrix of functions of said input vector u, and $\beta$ is a vector;

updating said received control parameters based upon said updated spectral PCA-based model; and communicating said updated control parameters to said color control system, said color control system using said updated control parameters to adjust said actuators for adaptive color control.

10. The system of claim 9, wherein said received initial sensitivity comprises, at least in part, a parameter matrix, a set of basis vectors, a nominal reflectance spectrum, and a nominal Jacobian matrix.

11. The system of claim 9, wherein determining said change in sensitivity comprises using a spectral principal component based color model.

12. The system of claim 9, wherein said control parameter is created from experimental data for an image forming device.

13. The system of claim 9, wherein updating said control parameter includes deriving a Jacobian matrix comprising at least—a nominal Jacobian matrix in spectral space, and a delta Jacobian in spectral space which has been updated using said measured spectra.

14. The system of claim 13, wherein said nominal Jacobian matrix in spectral space is extracted from a model for an image marking device.

15. The system of claim 9, wherein, in response to DMA targets being used as said actuators, said input vector $u_{mi}$ representing DMA values and wherein, in response to a Corotron grid voltage, exposure intensity, and donor roll voltage being used as said actuators, said input vector $u_{mi}$ being input data which represents those actuators.

16. The system of claim 9, wherein said actuators comprise any of: values of a level 2 xerographic subsystem, and set points of a level 2 xerographic process control system.

* * * * *